(12) United States Patent
Wolcott et al.

(10) Patent No.: US 10,754,344 B2
(45) Date of Patent: Aug. 25, 2020

(54) METHOD AND APPARATUS FOR ROAD HAZARD DETECTION

(71) Applicant: TOYOTA RESEARCH INSTITUTE, INC., Los Altos, CA (US)

(72) Inventors: Ryan W. Wolcott, Ann Arbor, MI (US); Alex Cunningham, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 216 days.

(21) Appl. No.: 16/039,514

(22) Filed: Jul. 19, 2018

(65) Prior Publication Data

US 2020/0026302 A1 Jan. 23, 2020

(51) Int. Cl.
G05D 1/02 (2020.01)
G08G 1/01 (2006.01)
G08G 1/0967 (2006.01)
G05D 1/00 (2006.01)
B60Q 9/00 (2006.01)

(52) U.S. Cl.
CPC ............. *G05D 1/0221* (2013.01); *B60Q 9/00* (2013.01); *G05D 1/0088* (2013.01); *G05D 1/027* (2013.01); *G05D 1/0214* (2013.01); *G05D 1/0246* (2013.01); *G05D 1/0255* (2013.01); *G05D 1/0257* (2013.01); *G05D 1/0276* (2013.01); *G08G 1/012* (2013.01); *G08G 1/096725* (2013.01); *G05D 2201/0213* (2013.01)

(58) Field of Classification Search
CPC .. G05D 1/0221; G05D 1/0214; G05D 1/0088; G05D 1/0257; G05D 1/0255; G05D 1/027; G05D 1/0276; G05D 1/0246; G05D 2201/0213; G08G 1/012; G08G 1/096725; B60Q 9/00
USPC .......................................................... 701/27
See application file for complete search history.

(56) References Cited

U.S. PATENT DOCUMENTS

| | | | |
|---|---|---|---|
| 9,145,143 B2 | 9/2015 | D'Amato et al. | |
| 9,421,979 B2 | 8/2016 | Szwabowski et al. | |
| 9,632,502 B1 | 4/2017 | Levinson et al. | |
| 9,780,435 B2 | 10/2017 | McAllister | |
| 9,781,243 B1 * | 10/2017 | Huang | H04W 4/70 |
| 9,840,252 B2 | 12/2017 | Bills et al. | |
| 9,977,425 B1 * | 5/2018 | McCann | G05B 23/0221 |
| 10,372,130 B1 * | 8/2019 | Kaushansky | G05D 1/0088 |

(Continued)

*Primary Examiner* — Muhammad Shafi
(74) *Attorney, Agent, or Firm* — Oblon, McClelland, Maier & Neustadt, L.L.P.

(57) ABSTRACT

A method and an apparatus for detecting a road hazard are provided. The method includes acquiring one or more sensor data from one or more sensors. The method further acquires traffic reference information and compares the one or more sensor data with the traffic reference information. A road hazard can be identified based on a comparison result between a first sensor data and the traffic reference information. Further, other sensor data are annotated to be associated with the road hazard. The other sensor data are collected within a same time frame in which the first sensor data captures the road hazard. The first sensor data that captures the road hazard and the other sensor data that are associated with the road hazard is output to a machine learning algorithm. The machine learning algorithm is trained based on the sensor data and deployed to identify a similar road hazard thereafter.

20 Claims, 6 Drawing Sheets

(56) References Cited

U.S. PATENT DOCUMENTS

| | | | |
|---|---|---|---|
| 2016/0331279 A1* | 11/2016 | Shpin | A61B 5/6898 |
| 2017/0083794 A1 | 3/2017 | Nallapa et al. | |
| 2017/0177954 A1* | 6/2017 | Micks | G06K 9/00812 |
| 2017/0206440 A1* | 7/2017 | Schrier | G06T 5/002 |
| 2018/0024578 A1* | 1/2018 | Ahuja | G06F 1/206 |
| | | | 700/300 |
| 2018/0261020 A1* | 9/2018 | Petousis | G07C 5/008 |
| 2019/0080527 A1* | 3/2019 | Cox | G07C 5/02 |

* cited by examiner

METHOD AND APPARATUS FOR ROAD HAZARD DETECTION

BACKGROUND

Detecting anomalies in a driving environment accurately and promptly are required when deploying self-driving technology. Systems and methods for developing, training, and proving algorithms for detecting anomalies or road hazards in a driving condition have been studied. U.S. Patent Application Publication No. 20170083794 A1 entitled "Virtual, Road-Surface-Perception Test Bed" is directed to a method for testing the performance of one or more anomaly-detection algorithms based on sensor data output by a virtual sensor modeling the behavior of an image sensor.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method, an apparatus, and a computer-readable medium configured to automatically detect a road hazard and train a machine learning algorithm so as to detect a similar road hazard effectively and promptly thereafter. The road hazard disclosed herein can include animals, rough roads (e.g., a pothole), gravel, bumpy edges, uneven expansion joints, slick surfaces, standing water, debris, snow, ice, objects that have fallen from a construction site or another vehicle, or the like. The present disclosure targets an autonomous vehicle. For purposes of this disclosure, an autonomous vehicle is generally referred to as "vehicle". According to an embodiment of the present disclosure, a method for road hazard detection is provided. In the disclosed method, one or more sensor data from one or more sensors is acquired. The one or more sensor data carrying traffic information that the vehicle encounters during driving. The method further acquires traffic reference information from a database and compares the one or more sensor data with the traffic reference information. A road hazard can be identified based on a comparison result between a first sensor data from a first sensor and the traffic reference information. Further, other sensor data from other sensors are annotated to be associated with the road hazard. The other sensor data are collected within a same time frame in which the first sensor data captures the road hazard. The first sensor data that captures the road hazard and the other sensor data that are associated with the road hazard is output to a machine learning algorithm. The machine learning algorithm is trained based on the first sensor data that captures the road hazard and the other sensor data that is associated with the road hazard. After the completion of the training, the machine learning algorithm is deployed to catch a similar road hazard accurately and promptly when the similar road hazard is encountered by the vehicle in the future.

In an embodiment, after the other sensor data is annotated, the method further includes updating the traffic reference information with the other sensor data that is annotated to be associated with the road hazard. The updated traffic reference information in the database therefore can portray the road hazard through the other sensors. Correspondingly, the updated traffic reference information in the database can improve the accuracy and efficiency to portray the road hazard.

In an embodiment, the comparison between the one or more sensor data with the traffic reference information includes operating sensor data processing to extract the traffic information from the one or more sensor data that the one or more sensor data carries, and comparing the traffic information and the traffic reference information.

In an embodiment, the comparison between the traffic information extracted from the one or more sensor data and the traffic reference information is operated through at least one of image recognition, pattern recognition, feature recognition, or signal recognition. In an example, the image recognition can detect a pothole based on an image captured by a camera mounted on the vehicle. In another example, the signal recognition can detect the pothole based on traffic signal, such as acceleration signal of the vehicle captured by an IMU (Inertial Measurement Unit) sensor.

In an embodiment, the traffic information that the one or more sensor data carries includes at least one of a position of the vehicle, a movement speed of the vehicle, a movement direction of the vehicle, positions of adjacent objects, movement speeds of adjacent objects, movement directions of adjacent objects, patterns of adjacent objects, images of adjacent objects, features of adjacent objects, a road condition, a traffic signal, and a road obstacle. In an embodiment, traffic reference information acquired from the database includes reference information of one or more road hazards that are captured by the one or the more sensors in previous events.

The method can further include providing a notice to a V2I system or a cloud-based system about the road hazard, and the V2I system or the cloud-based system can further inform other vehicles of the road hazard after the road hazard is identified. The method can also include informing a driving control unit of the vehicle to avoid the road hazard after the road hazard is identified.

An apparatus for detecting a road hazard and training a machine learning algorithm so as to detect a similar road hazard effectively and promptly thereafter is also disclosed. The apparatus includes the one or more sensors. The one or more sensors are installed in the vehicle and configured to detect the traffic information that the vehicle encounters during driving. The apparatus also includes processing circuitry that is configured to acquire the one or more sensor data from the one or more sensors. The processing circuitry further acquires the traffic reference information from the database and compares the one or more sensor data with the traffic reference information. A road hazard can be identified based on the comparison result between a first sensor data acquired from a first sensor and the traffic reference information. The processing circuitry is further configured to annotate other sensor data acquired from other sensors to be associated with the road hazard. The other sensor data is collected within the same time frame in which the first sensor data captures the road hazard. The processing circuitry then outputs the first sensor data that captures the road hazard and the other sensor data that are associated with the road hazard to a machine learning algorithm. The machine learning algorithm is trained by the processing circuitry based on the first sensor data that captures the road hazard and the other sensor data that is associated with the road hazard. Afterwards, the processing circuitry is configured to deploy the machine learning algorithm to catch the similar road hazard effectively and promptly when the similar road hazard is encountered by the vehicle in the future.

In an embodiment, the one or more sensors include at least one of a camera, a sonar sensor, a radar senor, an IMU (inertial measurement unit) sensor, motion sensors, and a LIDAR (Light Detecting and Ranging) senor.

In another embodiment, the processing circuitry is further configured to operate sensor data processing to extract the traffic information from the one or more sensor data that the one or more sensor data carries and compare the traffic information and the traffic reference information.

The apparatus further includes communication circuitry. The communication circuitry is configured to provide a notice to a V2I system or a cloud-based system about the road hazard, and the V2I system or the cloud-based system further informs other vehicles of the road hazard after the road hazard is identified.

The processing circuitry is further configured to inform a driving control unit of the vehicle to avoid the road hazard after the road hazard is identified.

In another embodiment, a non-transitory computer readable storage medium is provided. The medium has instructions stored thereon that when executed by processing circuitry causes the processing circuitry to perform operations to detect a road hazard and train a machine learning algorithm so as to detect a similar road hazard effectively and promptly thereafter.

In the present disclosure, the method and the apparatus detect the road hazard based on the first sensor data captured by the first sensor. The method and the apparatus further annotate the other sensor data captured by the other sensors to be associated with the road hazard. The other sensor data is collected within a same time frame in which the first sensor data captures the road hazard. The method and the apparatus further update the database with the other sensor data that is annotated to be associated with the road hazard. The updated database therefore can portray the road hazard through the other sensors. Correspondingly, the updated database can improve the accuracy and efficiency to portray the road hazard. The method and the apparatus further output the first sensor data that captures the road hazard and the other sensor data that are associated with the road hazard to the machine learning algorithm. The machine learning algorithm is trained based on the first sensor data that captures the road hazard and the other sensor data that are associated with the road hazard, and deployed to catch a similar road hazard effectively and promptly in a future event. The disclosed method and apparatus improve accuracy and efficiency over other approaches to detect the road hazard. The disclosed method and apparatus automatically detect the road hazard based on sensor data in real-time and use the detection to annotate the sensor data to be associated with the road hazard. The method and apparatus further update the database with the annotated sensor data, and train the machine learning algorithm based on the annotated sensor data. The updated database and the trained machine learning algorithm can be deployed to portray the road hazard through different sensor data so as to catch the road hazard accurately and promptly. Thus, identification of a first road hazard helps the vehicle avoid subsequent hazard immediately thereafter.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
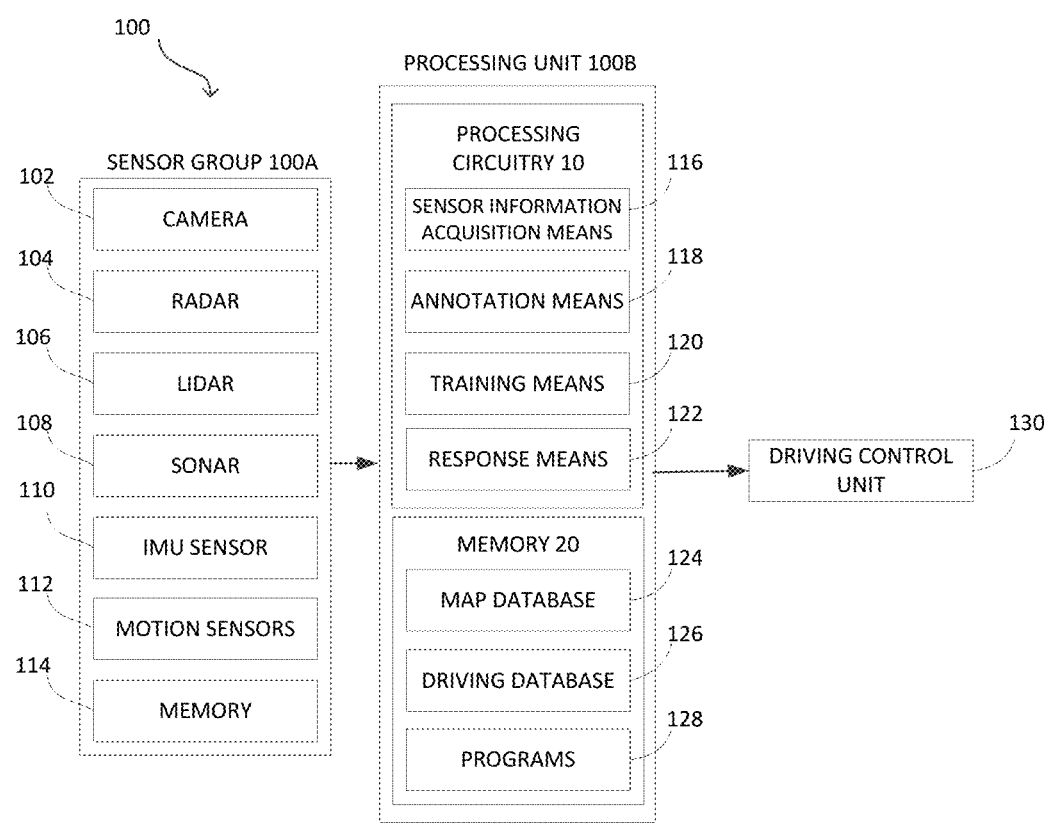
FIG. 1 is an illustration of an exemplary apparatus for road hazard detection, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

An autonomous vehicle can be configured to drive autonomously or automatically, that is, can take full control of driving the vehicle, such as acceleration, braking, steering, and the like. The autonomous vehicle is referred to as the vehicle in the current disclosure. The autonomous vehicle can have one or more sensors installed, such as a camera, a radar, a sonar, a LIDAR sensor, and an IMU sensor. The one or more sensors can be configured to capture surrounding traffic information of the vehicle during driving and generate one or more sensor data. The one or more sensor data can be sent to processing unit of the vehicle. The processing unit analyzes the one or more sensor data and makes driving operations based on the analyzed one or more sensor data. When deploying self-driving technology, it is important to detect a road hazard based on the sensor data that are captured by the sensors. The present disclosure is provided to automatically detect a road hazard and train a machine learning algorithm so as to detect a similar road hazard effectively and promptly thereafter.

FIG. 1 is an illustration of an exemplary apparatus 100 for road hazard detection. The apparatus 100 can include a sensor group 100A, a processing unit 100B and a driving control unit 130. The sensor group 100A can include a camera 102, a radar 104, a LIDAR 106, a sonar 108, a IMU sensor 110, motion sensors 112, and a memory 114, or the like. The camera 102 can be a visible light camera or an infrared camera. The camera 102 can be configured to acquire at least an image of surrounding traffic conditions when the vehicle drives. The surrounding traffic conditions can include a traffic signal, a traffic sign, a position of a surrounding vehicle, a position of a surrounding pedestrian, a road condition (e.g., a pothole, a speed hump), or the like. The image acquired by the camera 102 can be sent to the processing unit 100B for sensor data processing. The sensor data processing can be implemented by a signal processing, an imaging processing, and a video processing through a processing circuitry 10 of the apparatus 100. The vehicle can control itself by using the image acquired by the camera 102 and other sensor data acquired by other sensors in sensor group 110A. In an embodiment illustrated in FIG. 1, the camera 102 is a visible light camera and the image acquired by the camera 102 can be used for road hazard detection. The camera can be mounted on front, rear, top and sides of the vehicle depending on the technology requirement.

The radar 104 disclosed in FIG. 1 is configured to detect a front obstacle, a rear obstacle, or a side obstacle. The obstacle can be an adjacent vehicle, a pedestrian, or an adjacent object, or the like. The radar 104 can be a millimeter wave radar, a quasi-millimeter wave radar, or a near-infrared laser radar. The radar can be mounted on the front, rear, top and sides of the vehicle depending on the technology requirement. In an embodiment of FIG. 1, the radar 104 is a millimeter wave radar. The radar 104 mixes transmitted waves (millimeter waves) that are emitted from a transmitter and received waves reflected from the adjacent obstacle so as to extract a beat frequency in the mixed signal whereby information about a distance between the present vehicle and the adjacent obstacle is acquired, and outputs the information about the distance to the processing unit 100B.

The LIDAR 106 illustrated in FIG. 1 can literally map surroundings at the speed of light. The LIDAR 106 can emit laser pulses, such as 100 thousands laser pulses in a second, outwards in all directions until making contact with an object. Upon contact, the laser pulses reflect back to the LIDAR sensor 106. The LIDAR 106 receives and registers the reflected pulses. The LIDAR 106 can output the sensor data to the processing unit 100B, and the processing unit 100B can record the reflection pulses, and calculate the distance of the object based on the laser pulse's travel time. In an example, the processing unit 100B can identify a position, a movement speed and a movement direction of the adjacent vehicle or of the adjacent pedestrian through the LIDAR information. In another example, the processing unit 100B can translate the information obtained from the LIDAR 106 into an animated 3D representation of LIDAR's surroundings. The LIDAR 106 can be mounted in different locations on the vehicle, such as front light, brake light, door handle, or the top.

The sonar 108 emits sound waves that travel outwards in all directions until making contact with an object, resulting in an echoing sound wave that is redirected back to the source. The distance between the sonar and the object is then calculated based on the time that the echo takes to return, in relation to the known speed of sound. Based on the echoing sound wave, a position, a movement speed, or a movement direction of the object can be calculated. In an embodiment of FIG. 1, the sonar 108 can output generated sensor data to processing unit 100B. The processing unit 100B can calculate a distance between a vehicle where the sonar is mounted and an adjacent vehicle, or between the vehicle where the sonar is mounted and an adjacent pedestrian through the generated sensor data. The processing unit 100B can also identify the position, the movement speed and the movement direction of the adjacent vehicle or of the adjacent pedestrian based on the sonar information.

The IMU (Inertial measurement unit) sensor 110 is a device that is mounted in a fixed position within the body of the car. The safe function of any automated driving system is dependent on continuously knowing the dynamics of the vehicle in terms of location, position on the road, direction, orientation and velocity of the vehicle. To measure these characteristics necessitates the use of an inertial measurement unit (IMU). The IMU 110 consists of several gyroscopes and accelerometers. Based on the gyroscopes and accelerometers, the IMU 100 can provide a continuous stream of data related to the linear acceleration of the vehicle on three principal axes, together with the three sets of rotation parameters (pitch, roll and heading). It should be noted that the IMU sensor can only provide relative positions and movements of the vehicle, and GPS (Global Positioning System) can provide absolute positions and movements. IMU sensor can be integrated into the GPS based automotive navigation system for the autonomous vehicle to provide as accurate data as possible about the vehicle's current speed, turn rate, heading, inclination and acceleration.

Motion sensors 112 can include a plurality of sensors to acquire inner statuses of the vehicle. The sensors used to acquire the inner statues of the vehicle can include a position information sensor, a direction sensor, a speed sensor, an acceleration sensor, a yaw rate sensor, a steering angle sensor, an acceleration opening sensor, a braking pressure sensor, an engine rotational speed sensor, or the like.

The memory 114 of the sensor group 100A, as shown in FIG. 1, can be an auxiliary storage device configured to store the sensor data acquired by the sensors in the sensor group 100A. The memory 114 can be a magnetic disc, a semiconductor memory, or the like.

The processing unit 100B can be a well-known microcomputer or a processor having CPU (central processing unit), ROM (read only memory), RAM (random access memory) and I/O (input and output) interface. The processing unit 100B can realize various functions by reading programs 128 stored in memory 20 of the processing unit 100B. As shown in FIG. 1, the processing unit 100B can realize, via processing circuitry 10, a sensor information acquisition means 116, an annotation means 118, a training means 120 and a response means 122. However, some or all of these functions may be realized by an application specific integrated circuit (ASIC), a field programmable gate array (FPGA), a digital signal processor (DSP), or the like. In addition, the processing unit 100B is not necessarily constituted by a single processor but may be constituted by a plurality of processors. For example, each function/means mentioned above can be associated with a dedicated chip.

The processing unit 100B can include memory 20. The memory 20 can be a magnetic disc, a semiconductor memory, or the like. The memory 20 can include a map database 124 configured to provide traffic route/map information for the automotive navigation system, a driving database 126 configured to provide traffic reference information and programs 128 configured to implement various functions of the apparatus 100 when executed by processing circuitry 10. The traffic reference information can include reference information of one or more road hazards that are captured by the one or the more sensors in previous events. The program 128 can include a machine learning algorithm that can be trained and deployed to the annotation means 118 for road hazard detection.

The sensor information acquisition means 116 is configured to continuously, or periodically, or as occasion demands acquire one or more sensor data from the one or more sensors in sensor group 100A. The sensor data acquisition can be implemented by interface circuitry (not shown in FIG. 1) that is integrated into the processing unit 100B. As mentioned above, the sensor group 100A can include a camera 102, a radar 104, a LIDAR 106, a sonar 108, a IMU sensor 110, motion sensors 112, and a memory 114, or the like. Upon the completion of sensor data acquisition, the sensor information acquisition means 116 sends the one or more sensor data to the annotation means 118 for sensor data processing.

The annotation means 118 can operate sensor data processing to analyze the one or more sensor data to extract traffic information that the one or more sensor data carries. The traffic information includes a position of the vehicle, a movement speed of the vehicle, a movement direction of the vehicle, positions of adjacent objects, movement speeds of adjacent objects, movement directions of adjacent objects, patterns of adjacent objects, images of adjacent objects, features of adjacent objects, a road condition, a traffic signal, a road obstacle, or the like. The sensor data processing can be implemented by a signal processing, an image processing, a video processing, or the like.

The annotation means 118 further retrieves traffic reference information from the driving databased 126 that is stored in memory 20 and compares the traffic information extracted from the sensor data and the traffic reference data. In an embodiment, the comparison between the traffic information extracted from the one or more sensor data and the traffic reference information is operated through at least one of image recognition, pattern recognition, feature recognition, or signal recognition. In an embodiment, the image recognition can detect a pothole based on an image captured by a camera mounted on the vehicle. In another embodiment, the signal recognition can detect the pothole based on traffic signal, such as acceleration signal of the vehicle captured by an IMU (Inertial Measurement Unit) sensor. For example, upon the completion of the sensor data processing, the annotation means 118 reveals that a first sensor data collected by a first sensor (e.g., the IMU sensor 110) indicates a fluctuation in acceleration of the vehicle. By compare this traffic information extracted from the first sensor data of the first sensor (e.g., IMU 110) with the traffic reference information, the annotation means 118 reveals that a road hazard, such as a pothole or a speed hump, is associated with a similar fluctuation in acceleration captured by the IMU sensor in the traffic reference information. Based on this comparison result, the annotation means 118 can determine that the road hazard (e.g., the pothole or the speed hump) exists in adjacent locations.

The annotation means 118 further can annotate other sensor data from other sensors (e.g., the camera 102, the radar 104, the LIDAR 106, the sonar 108, and motion sensors 112) to be associated with the road hazard (e.g., the pothole or the speed hump). The other sensor data from the other sensors is collected within a same time frame in which the first sensor data from the first sensor (e.g., IMU 110) captures the road hazard. In the present disclosure, annotating sensor data means labelling or defining sensor data. For example, once the pothole is detected based on the sensor data from IMU sensor 110, camera image from a time just before the impact with the pothole can be logged and annotated or labeled as including the pothole.

Upon the completion of the sensor data processing and annotation, the annotation means 118 can output the first sensor data from the first sensor (e.g., the IMU 110) that captures the road hazard and the other sensor data from the other sensors that are annotated to be associated with the road hazard to training means 120 to train a machine learning algorithm. The annotation means 118 can also output the first sensor data from the first sensor (e.g., the IMU 110) that captures the road hazard and the other sensor data from the other sensors that are annotated to be associated with the road hazard to driving database 126 for updating the traffic reference information.

The training means 120 can receive the sensor data output by the annotation means 118. The training means 120 can also retrieve the machine learning algorithm from programs 128 to train the machine learning algorithm based on the received sensor data, such as the first sensor data from the first sensor (e.g., the IMU 110) that captures the road hazard and the other sensor data from the other sensors that are annotated to be associated with the road hazard. The machine learning algorithm training process can be illustrated in FIG. 5. Once the machine learning algorithm is trained, the training means 120 can deploy the machine learning algorithm to the annotation means 118. The annotation means 118 can further detect a similar road hazard through the machine learning algorithm accurately and promptly in a future event.

The response means 122 is configured to receive instruction from the annotation means 118, and respond to the instruction. Upon the completion of the sensor data processing and annotation, the annotation means 118 can also send an instruction to response means 122 to inform the road hazard that is identified. The response means 122 accordingly can send a request to the annotation means 118 to acquire the traffic information associated with the road hazard, such as locations of the road hazard. The response means 122 further sends the traffic information associated with the road hazard to the driving control unit 130. The response means 122 also sends instructions to the driving control unit 130 to avoid the road hazard. The driving control unit 130 can use the received traffic information associated with the road hazard to control the vehicle to avoid the road hazard. For example, the driving control unit 130 can guild the vehicle to take a detour route, stop at a safe place, or change a traffic lane. The driving control unit 130 can also alert driver of the vehicle to the road hazard. In another example, the driving control unit 30 can guild the vehicle to take full autonomy avoidance of the road hazard, steer around, or slow down for the road hazard.

The driving control unit 130 can be electro-mechanical equipment to guild the vehicle to take full autonomy avoidance of the road hazard. In an example, the driving control unit 130 can be integrated into or be a part of an anti-lock braking system (ABS) in the vehicle. In another example, the driving control unit 130 can be integrated into or be a part of advanced driver-assistance system (ADAS) in the vehicle. The driving control unit 130 can receive the instructions from the response means 122 and control the autonomous vehicle accordingly. For example, when the road hazard is identified, the response means 122 sends the traffic information associated with the road hazard and the instructions to the driving control unit 130, and the driving control unit 130 can control the vehicle to avoid the road hazard by taking a detour route, stopping at a safe place, or taking a different traffic lane. The driving control unit 130 can also alert the driver of the vehicle to the road hazard. In another example, the driving control unit 30 can guild the vehicle to take full autonomy avoidance of the road hazard, steer around, or slow down for the road hazard.

The driving database 126 can store traffic reference information and send traffic reference information to annotation means 118 continuously, or periodically, or as occasion demands. The traffic reference information can be either stored in the driving database 126 previously or updated by a third party server remotely and periodically, or updated by the annotation means 118. When the driving database 126 is updated by the third party server, the update is processed with an encryption method to prevent spoofing. The traffic reference information stored in the driving database 126 includes all kinds of sensor data for portraying the traffic information, such as a camera data of a pothole, a LIDAR data of a walking pedestrian or a falling object (e.g., a barrel) from circumjacent location when the vehicle drives, or other traffic information related to road hazards. The traffic reference information can also include the traffic information, such as a position of the vehicle, a movement speed of the vehicle, a movement direction of the vehicle, positions of adjacent objects, movement speeds of adjacent objects, movement directions of adjacent objects, a road condition, a traffic signal, a road obstacle, or the like. The traffic reference information can be used to compare with the sensor data acquired from sensor group 100A to detect a road hazard.

Figure 2:
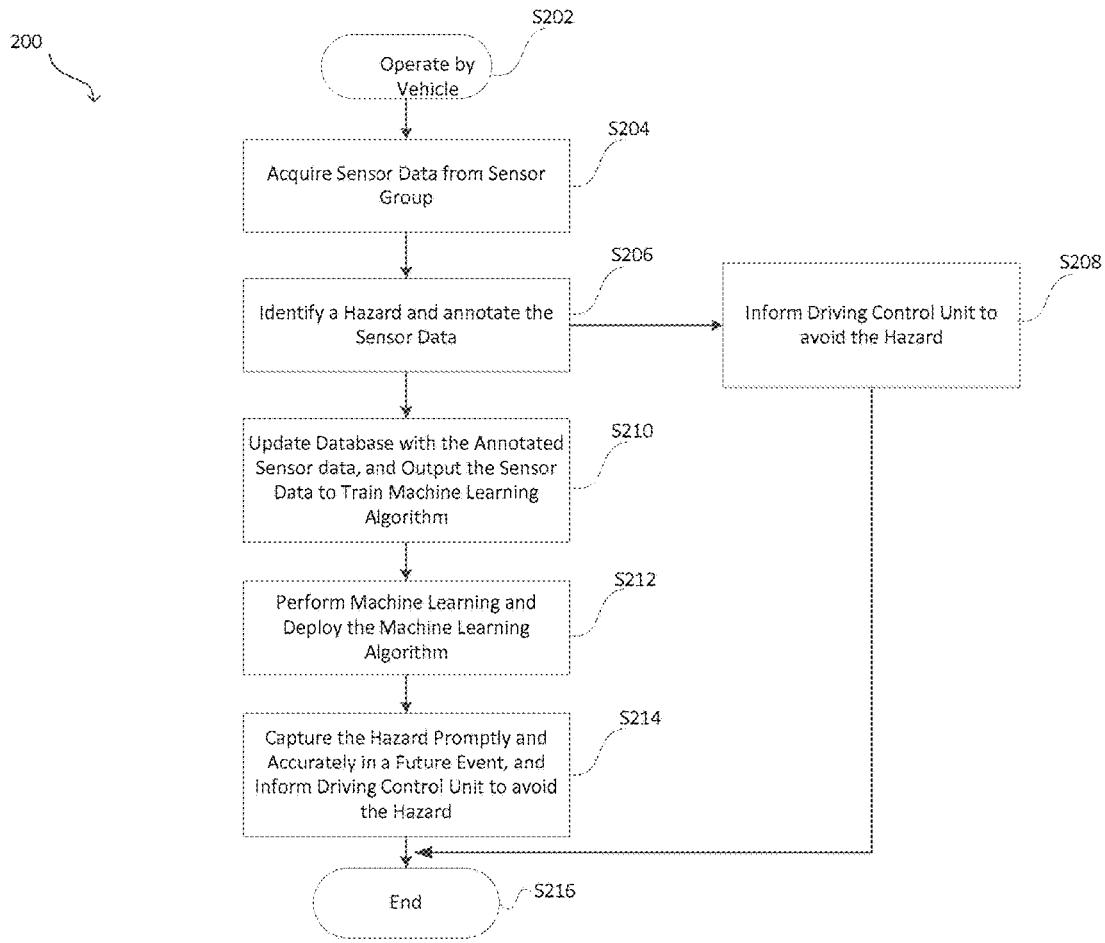
FIG. 2 is a flowchart outlining an exemplary operation for road hazard detection, in accordance with some embodiments.

FIG. 2 illustrates a flowchart 200 outlining an exemplary operation for road hazard detection, in accordance with embodiments of apparatus 100. The flowchart 200 starts with step 202 where the apparatus 100 for road hazard detection is operated by an autonomous vehicle, also referred to as a vehicle. As the vehicle drives, the one or more sensors in the sensor group 100A of the apparatus 100 sense the surrounding traffic information and generate one or more sensor data. The one or more sensor data can be stored in the sensors or in the memory 114. The one or more sensors can include a camera 102, a radar 104, a LIDAR 106, a sonar 108, a IMU sensor 110, motion sensors 112, or the like.

The flowchart 200 then proceeds to step 204, and the sensor information acquisition means 116 of the apparatus 100 acquires the one or more sensor data continuously, or periodically, or as occasion demands from the sensor group 100A. Upon the completion of sensor data acquisition, the sensor information acquisition means 116 sends the one or more sensor data to the annotation means 118 for sensor data processing.

In step 206 of the flowchart 200, annotation means 118 can operate sensor data processing to analyze the one or more sensor data so as to extract the traffic information that the one or more sensor data carries. The sensor data processing can be implemented by a signal processing, an image processing, a video processing, or the like. Upon the completion of the sensor data processing, the traffic information that the one or more sensor data carries can be identified and extracted. The traffic information can include a position of the vehicle, a movement speed of the vehicle, a movement direction of the vehicle, positions of adjacent objects, movement speeds of adjacent objects, movement directions of adjacent objects, patterns of adjacent objects, images of adjacent objects, features of adjacent objects, a road condition, a traffic signal, a road obstacle, or the like.

Figure 3:
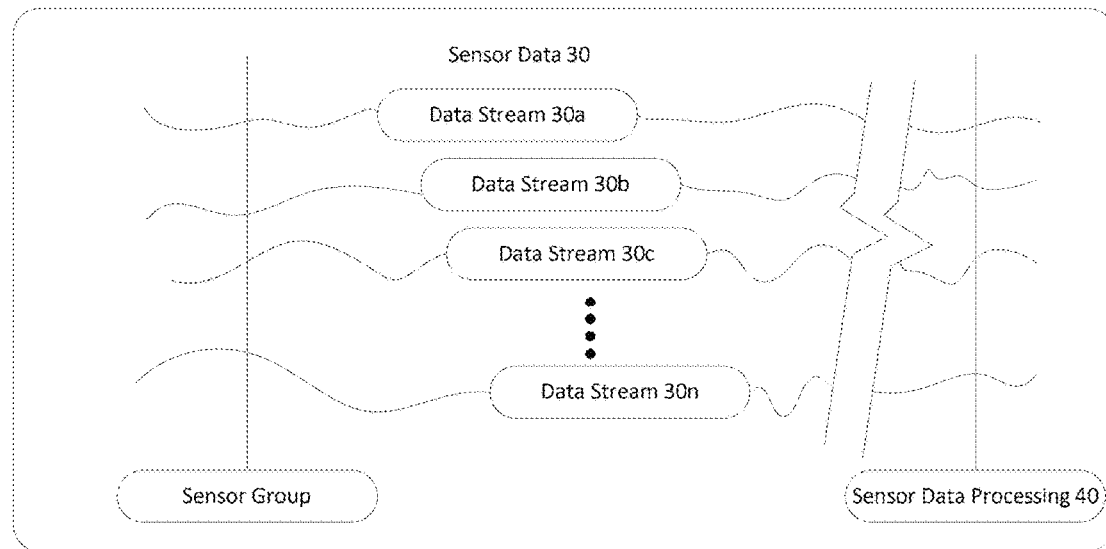
FIG. 3 is an illustration of a schematic diagram for sensor data processing, in accordance with some embodiments.
Figure 4:
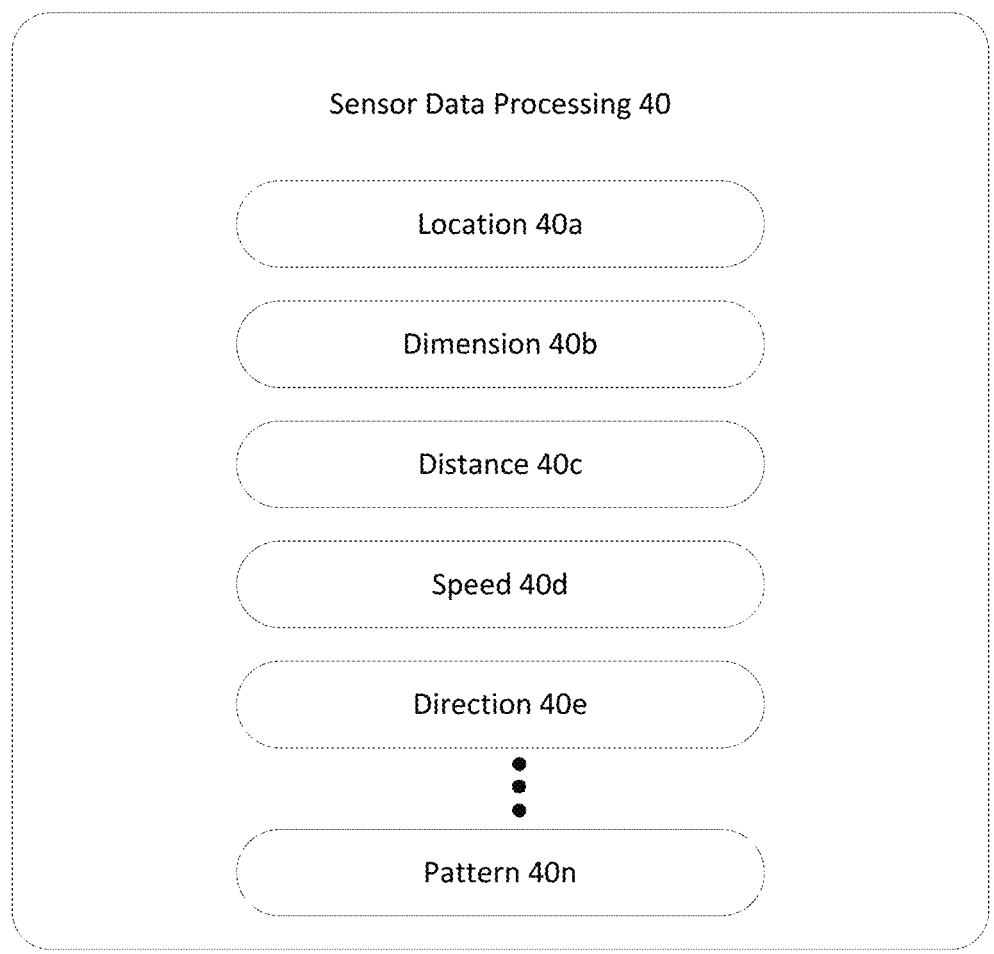
FIG. 4 is a schematic block diagram illustrating an exemplary output of the sensor data processing, in accordance with some embodiments.

FIG. 3 is an illustration of a schematic diagram for sensor data processing 40 that is performed by the annotation means 118. As shown in FIG. 3, the sensor data 30 can be acquired by the sensor information acquisition means 116 from the sensor group 100A. The sensor data 30 can include one or more sensor data (or output) generated by the one or more sensors in sensor group 100A. In one embodiment, different data streams 30 can represent output of different sensors in the sensor group 100A. For example, a first data stream 30a can represent the output of the camera 102, and a second data stream 30b can represent the output of the radar 104. Once the sensor data 30 is acquired, the sensor information acquisition means 116 can output the sensor data 30 to annotation means 118. The annotation means 118 further perform sensor data processing 40 to extract the traffic information that is carried by the sensor data 30. The exemplary output of the sensor data processing 40 can be illustrated in FIG. 4. In FIG. 4, the output of the sensor data processing provides the traffic information that is carried by the sensors in sensor group 100A. The traffic information, shown as in FIG. 4, can include location 40a, dimension 40b, distance 40c, speed 40d and so on to identify the traffic information that the vehicle encounters during driving. In another example, the traffic information can identify an image of a pothole, a speed hump, a walking pedestrian or a falling object (e.g., a barrel) from circumjacent location when the vehicle drives.

Still referring to step 206 in FIG. 2, the annotation means 118 further acquires the traffic reference information from the driving database 126. The traffic reference information stored in the driving database 126 includes all kinds of sensor data for portraying the traffic information, such as a camera data of a pothole, a LIDAR data of a walking pedestrian or a falling object (e.g., a barrel) from circumjacent location when a vehicle drives. The traffic reference information also include traffic information, such as a position of the vehicle, a movement speed of the vehicle, a movement direction of the vehicle, positions of adjacent objects, movement speeds of adjacent objects, movement directions of adjacent objects, patterns of adjacent objects, images of adjacent objects, features of adjacent objects, a road condition, a traffic signal, a road obstacle, or the like.

Once the traffic reference information is acquired, the annotation means 118 can compare the traffic information extracted from the sensor data and the traffic reference data acquired from the driving database 126. The comparison between the traffic information extracted from the one or more sensor data and the traffic reference information can be operated through image recognition, pattern recognition, feature recognition, or signal recognition. In an embodiment, the image recognition can detect a pothole based on an image captured by a camera mounted on the vehicle. In another embodiment, the signal recognition can detect the pothole based on traffic signal, such as acceleration signal of the vehicle captured by an IMU (Inertial Measurement Unit) sensor. For example, upon the completion of the sensor data processing, the annotation means 118 reveals that a first sensor data collected by a first sensor (e.g., the IMU sensor 110) indicates a fluctuation in acceleration of the vehicle. By compare this traffic information extracted from the first sensor data of the first sensor (e.g., IMU 110) with the traffic reference information, the annotation means 118 reveals that a road hazard, such as a pothole or a speed hump, is associated with a similar fluctuation in acceleration captured by the IMU sensor and stored in the traffic reference information. Based on this comparison result, the annotation means 118 can determine that the road hazard (e.g., the pothole or the speed hump) exists in adjacent locations.

The flowchart 200 therefore proceeds to step 208, where the annotation means 118 sends instruction to the response means 122 to inform the road hazard that is identified. The response means 122 correspondingly can send a request to the annotation means 118 to acquire the traffic information associated with the road hazard, such as locations of the road hazard. The response means 122 further sends the traffic information associated with the road hazard and instructions to the driving control unit 130 to avoid the potential hazard. The driving control unit 130 can use the received traffic information to control the vehicle to avoid the road hazard. For example, the driving control unit 130 can guild the vehicle to take a detour route, stop at a safe place, or change a traffic lane. The driving control unit 130 can also alert the driver of the vehicle to the road hazard. In another example, the driving control unit 30 can guild the vehicle to take full autonomy avoidance of the road hazard, steer around, or slow down for the road hazard.

The flowchart 200 then proceeds to step 210. In step 210, the annotation means 118 firstly annotates other sensor data from other sensors (e.g., the camera 102, the radar 104, the LIDAR 106, the sonar 108, and motion sensors 112) to be associated with the road hazard (e.g., the pothole or the speed hump). The other sensor data from the other sensors is collected within a same time frame in which the first sensor data from the first sensor (e.g., IMU 110) captures the road hazard. For example, once the pothole is detected based on the sensor data from IMU sensor 110, camera image from a time just before the impact with the pothole can be logged and annotated or labeled as including the pothole. After the sensor data annotation, the annotation means 118 outputs the first sensor data from the first sensor (e.g., the IMU 110) that captures the road hazard and the other sensor data from the other sensors that are annotated to be associated with the road hazard to the training means 120 to train a machine learning algorithm. The annotation means 118 can also output the first sensor data from the first sensor (e.g., the IMU 110) that captures the road hazard and the other sensor data from the other sensors that are annotated to be associated with the road hazard to driving database 126 to updating the traffic reference information.

In step 212, the training means 120 can receive the sensor data output by the annotation means 118. The training means 120 can also retrieve the machine learning algorithm from programs 128 to train the machine learning algorithm based on the received sensor data, such as the first sensor data from the first sensor (e.g., the IMU 110) that captures the road hazard and the other sensor data from the other sensors that is annotated to be associated with the road hazard. The machine learning algorithm training process can be illustrated in FIG. 5. Once the machine learning algorithm is trained, the training means 120 can deploy the machine learning algorithm to the annotation means 118. The annotation means 118 can further detect a similar road hazard through the machine learning algorithm accurately and promptly in a future event.

Figure 5:
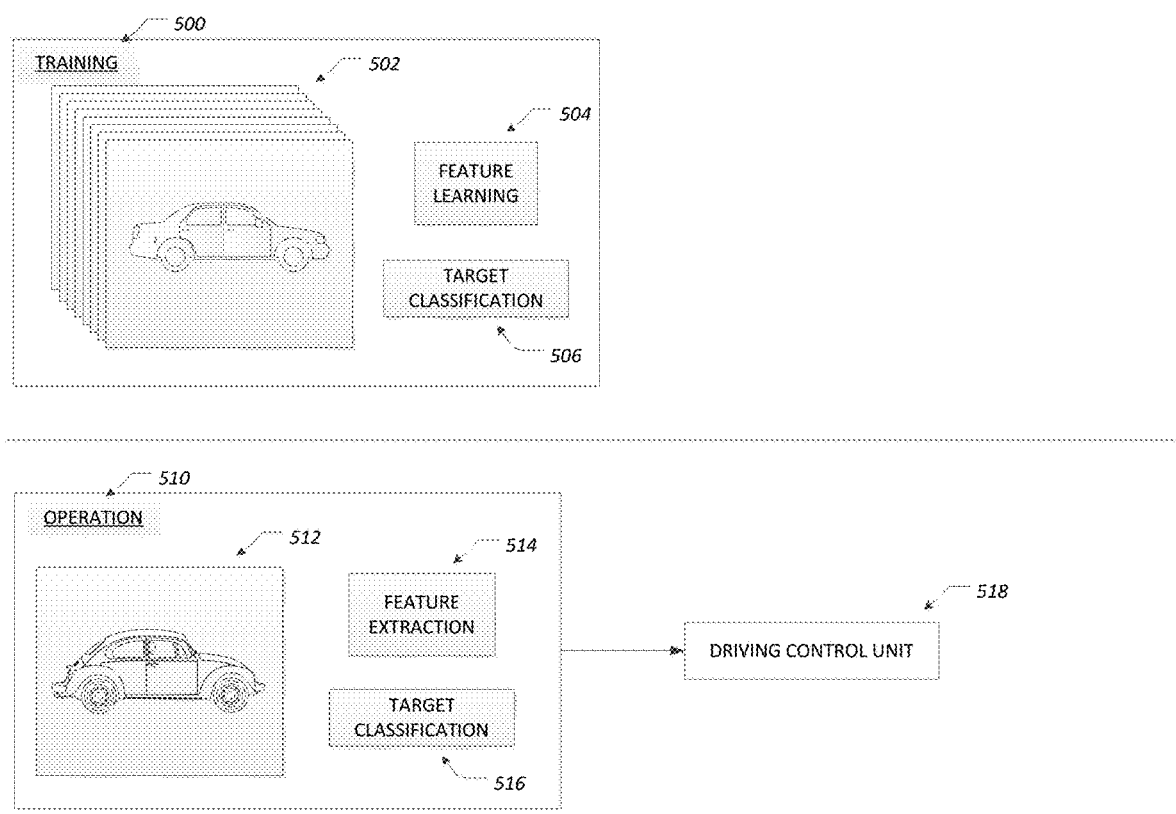
FIG. 5 is a schematic diagram illustrating an exemplary machine learning process, in accordance with some embodiments.

FIG. 5 illustrates an exemplary machine learning process performed by the training means 120. As shown in FIG. 5, 502 is a curated database that includes all the sensor data, including the IMU sensor data that detects the pothole. In an exemplary embodiment, training 500, such as a standard supervised learning 500, can be implemented. While a supervised learning is described herein, it should not be considered limiting and is merely representative of a variety of approaches to object recognition. For example, an unsupervised learning or a deep learning can be applied as well. In the context of the present disclosure, the training 500 retrieves sensor information from the curated database 502 and a machine learning algorithm from programs 128. The database 502 contains all sensor data associated with the experienced road hazard mentioned above. In an embodiment, the curated database 502 is part of the training means 120. In another embodiment, the curated database 502 can be stored in the memory 20 as shown in FIG. 1. The curated database 502 is actively maintained and updated via system software or via cloud-based system software updates. Feature learning 504 and target classification 506 are performed on the database 502 to portray the road hazard (e.g., a pothole). Generally, feature learning 504 includes iterative convolution, activation via rectified linear units, and pooling, while classification 506 includes associating learned features with known labels (e.g., a pothole). Learned features (e.g. images, signal parameters, patterns) may be manually selected or determined by the training 500. Upon the completion of the training 500, the machine learning algorithm can be applied for detecting a future road hazard. In addition, after the supervised learning 500 is completed, the road hazard initially captured by IMU sensor can be portrayed by other sensors. For example, image information captured by the camera in real-time can portray the same road hazard (e.g., pothole, or a speed hump).

Following training 500, testing (not shown) of the machine learning algorithm is performed to ensure accuracy. Features are extracted from a test road hazard (e.g., pothole, or a speed hump) and classified according to the training classifier 500. Following confirmation of the efficacy of the trained classifier, the training means 120 can deploy the trained machine learning algorithm to the annotation means 118.

The flowchart 200 proceeds to step 214. Still referring to FIG. 5, an operating 510 can be demonstrated based on machine learning results to catch a similar road hazard accurately and promptly in the future. In an embodiment, the similar hazard 512 can be experienced for the vehicle during driving. The annotation means 118 can operate feature extraction 514 and target classification 516 through the machine learning algorithm that is trained and deployed by the training means 120, based on the acquired sensor data that is associated with the hazard 512. The annotation means 118 can identify the road hazard promptly and accurately through the machine learning operating 510 based on all the acquired sensor data. The annotation means 118 further inform the response means with the road hazard and the response means send the traffic information associated with the road hazard to the driving control unit. The driving control unit controls the vehicle accordingly to avoid the road hazard. For example, the driving control unit 130 can take a detour route, stop at a safe place, or change a traffic lane to avoid the potential hazard. The driving control unit 130 can also alert the driver of the vehicle to the road hazard. In another example, the driving control unit 30 can guild the vehicle to take full autonomy avoidance of the road hazard, steer around, or slow down for the road hazard.

Figure 6:
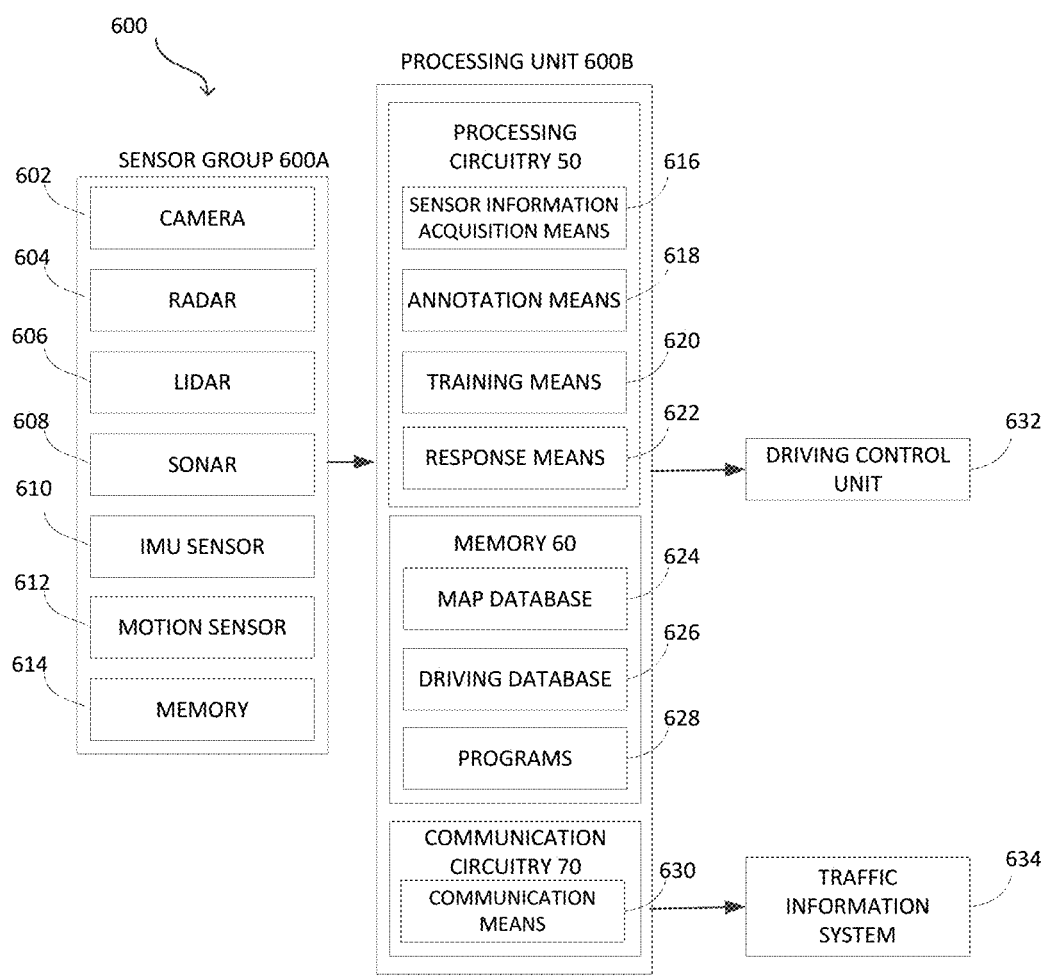
FIG. 6 is an illustration of another exemplary apparatus for road hazard detection, in accordance with some embodiments.

FIG. 6 illustrates another exemplary apparatus for road detection 600. Comparing to the apparatus 100, communication circuitry 70 and a traffic information system 634 are included in the apparatus 600. As shown in FIG. 6, the communication circuitry 70 can realize a communication means 630. The communication means 630, via the communication circuitry 70, can be configured to communicate with any suitable device using any suitable communication technologies, such as wired, wireless, fiber optic communication technologies, and any suitable combination thereof. In an example, the communication means 630 can be used to communicate with other vehicles in vehicle to vehicle (V2V) communication, and with an infrastructure, such as a cloud services platform, in vehicle to infrastructure (V2I) communication. In an embodiment, the communication circuitry 70 can include any suitable communication devices using any suitable communication technologies. In an example, the communication circuitry 70 can use wireless technologies, such as IEEE 802.15.1 or Bluetooth, IEEE 802.11 or Wi-Fi, mobile network technologies including such as global system for mobile communication (GSM), universal mobile telecommunications system (UMTS), long-term evolution (LTE), fifth generation mobile network technology (5G) including ultra-reliable and low latency communication (URLLC), and the like.

The traffic information system 634 can be a V2I system or a cloud-based system. The traffic information system 634 can be configured to receive the road hazard information from the annotation means, such as the location of the pothole, and then provide the road hazard information wirelessly to other vehicles as a safety reminder. The traffic information system 634 can also receive the traffic information provided from other vehicles or other infrastructures and then provide the traffic information to the vehicle to inform driver of safety, mobility, or environment-related conditions.

Figure 7:
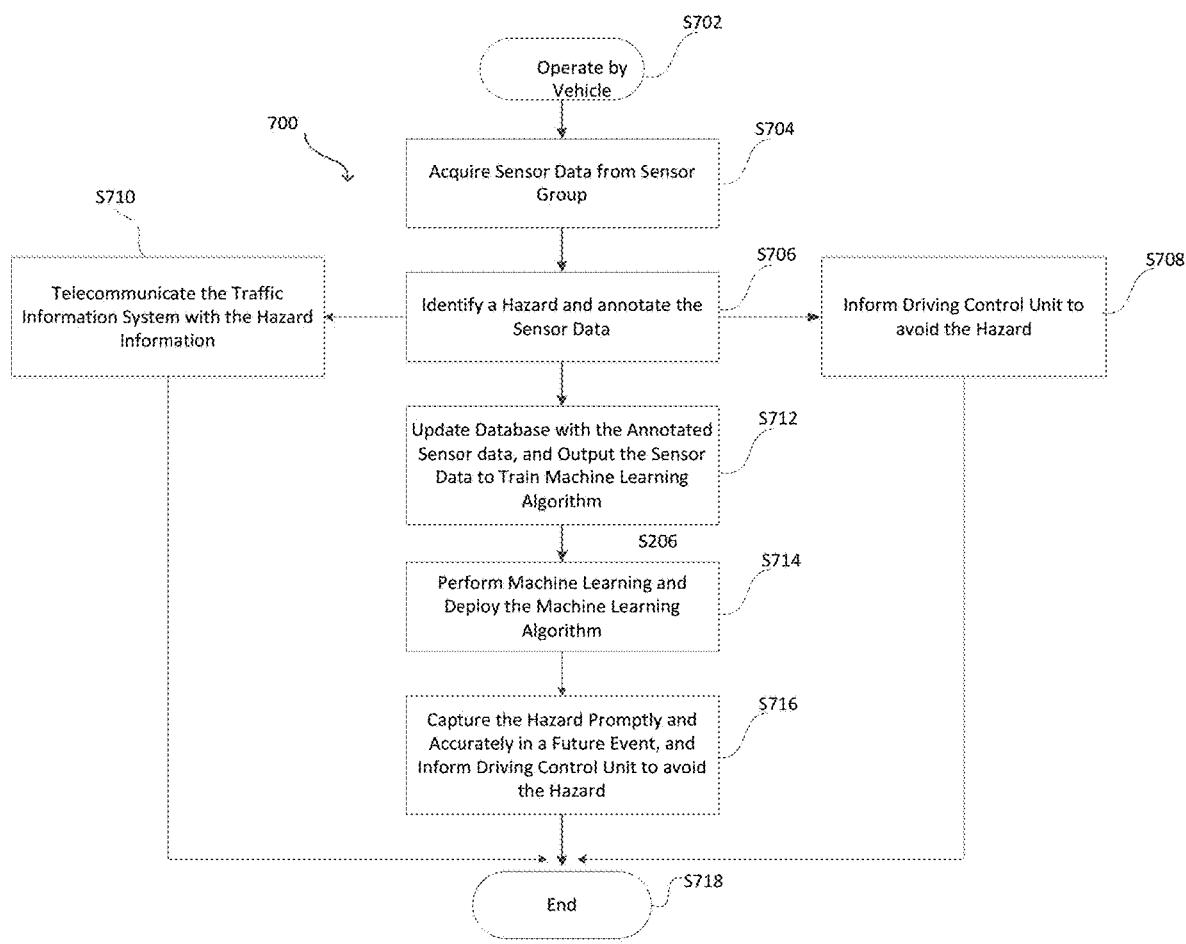
FIG. 7 is a flowchart illustrating another exemplary operation for road hazard detection, in accordance with some embodiments.

FIG. 7 is a flowchart 700 that illustrates another exemplary operation for road hazard detection, in accordance with the apparatus 600. Comparing with the flowchart 200, the flowchart 700 can have a new step S710. In step S710, after the road hazard is identified by annotation means 618 (shown in FIG. 6), the annotation means 618 can send the road hazard information, such as locations of the road hazard, to the communication circuitry 70. The communication circuitry 70 can inform the traffic information system 634 of the road hazard information. The traffic information system 634 subsequently can provide the road hazard information to other vehicles.

In the present disclosure, a novel method and an apparatus for detecting a road hazard associated with an autonomous vehicle is provided. The apparatus has a sensor group, a processing unit, a driving control unit and a traffic information system. The sensor group can include one or more sensors and the one or more sensors can generate one or more sensor data. The one or more sensor data can be acquired by the processing unit and analyzed to detect a road hazard. The processing unit can further annotate or label the sensor data to be associated with the road hazard. The annotated sensor data can be used to update a traffic reference database for portraying the road hazard accurately based on different sensor data. The annotated sensor data can also be used to train a machine learning algorithm. The trained machine learning algorithm can be deployed to catch a similar road hazard accurately and promptly in a future event. The apparatus can further send the road hazard information to other vehicles through a traffic information system (e.g., a V2I system or a cloud-based system). The disclosed method and apparatus improves accuracy and efficiency over other approaches to detect the road hazard. The disclosed method and apparatus automatically detect the road hazards based on sensor data in real-time and use the detection to annotate the sensor data. The method and apparatus further update the database with the annotated sensor data, and train the machine learning algorithm based on the annotated sensor data. The updated database and the trained machine learning algorithm can be deployed to portray the road hazard through different sensor data so as to catch the road hazard accurately and promptly.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A method for road hazard detection, comprising:
  acquiring, via interface circuitry installed in a vehicle, one or more sensor data generated by one or more sensors, the one or more sensor data carrying traffic information that the vehicle encounters during driving;
  acquiring, via the interface circuitry, traffic reference information from a database;
  comparing, using processing circuitry, the one or more sensor data with the traffic reference information;
  identifying, using the processing circuitry, a road hazard based on a comparison result between a first sensor data from a first sensor and the traffic reference information;
  annotating, via the processing circuitry, other sensor data from other sensors to be associated with the road hazard, the other sensor data from the other sensors being collected within a same time frame in which the first sensor data from the first sensor captures the road hazard;
  outputting, via the interface circuitry, the first sensor data from the first sensor that captures the road hazard and the other sensor data from other sensors that are associated with the road hazard to a machine learning algorithm;
  training, via the processing circuitry, the machine learning algorithm based on the first sensor data from the first sensor that captures the road hazard and the other sensor data from the other sensors that are associated with the road hazard; and
  deploying the machine learning algorithm to identify a similar road hazard in a new event based on one or more sensor data that is acquired in the new event.

2. The method of claim 1, further comprising, after the annotating the other sensor data:
  updating the traffic reference information with the other sensor data that is annotated to be associated with the road hazard to portray the road hazard through the other sensors.

3. The method of claim 1, further comprising:
  providing a notice to a V2I system or a cloud-based system about the road hazard, wherein the V2I system or the cloud-based system further informs other vehicles of the road hazard after the road hazard is identified.

4. The method of claim 1, further comprising:
  informing a driving control unit of the vehicle to avoid the road hazard after the road hazard is identified, the vehicle accordingly taking full autonomy avoidance of the road hazard, steering around, or slowing down for the road hazard; and
  alerting a driver of the vehicle of the road hazard.

5. The method of claim 1, further comprising, after the deploying the machine learning algorithm to identify the similar road hazard:
informing a driving control unit of the vehicle to avoid the road hazard after the road hazard is identified, the vehicle accordingly taking full autonomy avoidance of the road hazard, steering around, or slowing down for the road hazard; and
alerting a driver of the vehicle of the road hazard.

6. The method of claim 1, wherein the comparing the one or more sensor data with the traffic reference information further comprises:
operating sensor data processing to extract the traffic information from the one or more sensor data that the one or more sensor data carries; and
comparing the traffic information that is extracted from the one or more sensor data and the traffic reference information.

7. The method of claim 6, wherein the comparing the traffic information and the traffic reference information includes comparing the traffic information and the traffic reference information through at least one of image recognition, pattern recognition, feature recognition, or signal recognition.

8. The method of claim 1, wherein the acquiring the one or more sensor data from the one or more sensors includes acquiring the sensor data from at least one of a camera, a sonar sensor, a radar senor, a IMU (inertial measurement unit) sensor, motion sensors, and a LIDAR (Light Detecting and Ranging) sensor.

9. The method of claim 1, wherein the traffic information that the one or more sensor data carries includes at least one of: a position of the vehicle, a movement speed of the vehicle, a movement direction of the vehicle, positions of adjacent objects, movement speeds of the adjacent objects, movement directions of the adjacent objects, patterns of the adjacent objects, images of the adjacent objects, features of the adjacent objects, a road condition, a traffic signal, and a road obstacle.

10. The method of claim 1, wherein the acquiring the traffic reference information from the database includes acquiring reference information of one or more road hazards that are captured by the one or the more sensors in previous events.

11. The method of claim 1, wherein the training the machine learning algorithm is operated through at least one of a supervised learning technique, an unsupervised learning technique, or a deep learning technique.

12. An apparatus for road hazard detection, comprising:
one or more sensors, the one or more sensor installed in a vehicle and configured to generate one or more sensor data, the one or more sensor data carrying traffic information that the vehicle encounters during driving; and
processing circuitry configured to:
acquire, via interface circuitry, the one or more sensor data from the one or more sensors;
acquire, via the interface circuitry, traffic reference information from a database;
compare the one or more sensor data with the traffic reference information;
identify a road hazard based on a comparison result between a first sensor data from a first sensor and the traffic reference information;
annotate other sensor data from other sensors to be associated with the road hazard, the other sensor data from other sensors being collected within a same time frame in which the first sensor data from the first sensor captures the road hazard;
output, via the interface circuitry, the first sensor data from the first sensor that captures the road hazard and the other sensor data from the other sensors that are associated with the road hazard to a machine learning algorithm;
train the machine learning algorithm based on the first sensor data from the first sensor that captures the road hazard and the other sensor data from the other sensors that are associated with the road hazard; and
deploy the machine learning algorithm to identify a similar road hazard in a new event based on one or more sensor data that is acquired in the new event.

13. The apparatus of claim 12, wherein the one or more sensors include at least one of a camera, a sonar sensor, a radar senor, an IMU (inertial measurement unit) sensor, motion sensors, and a LIDAR (Light Detecting and Ranging) sensor.

14. The apparatus of claim 12, wherein the processing circuitry is further configured to:
operate sensor data processing to extract the traffic information from the one or more sensor data that the one or more sensor data carries; and
compare the traffic information that is extracted from the one or more sensor data and the traffic reference information.

15. The apparatus of claim 12, further comprising:
communication circuitry configured to
provide a notice to a V2I system or a cloud-based system about the road hazard, wherein the V2I system or the cloud-based system further informs other vehicles of the road hazard after the road hazard is identified.

16. The apparatus of claim 15, wherein, after the machine learning algorithm is deployed to identify the similar road hazard, the communication circuitry is further configured to:
provide a notice to a V2I system or a cloud-based system about the similar road hazard, wherein the V2I system or the cloud-based system further informs other vehicles of the similar road hazard after the similar road hazard is identified.

17. The apparatus of claim 12, wherein the processing circuitry is further configured to:
inform a driving control unit of the vehicle to avoid the road hazard after the road hazard is identified, the vehicle accordingly taking full autonomy avoidance of the road hazard, steering around, or slowing down for the road hazard; and
alert a driver of the vehicle of the road hazard.

18. The apparatus of claim 12, further comprising:
memory configured to
store the traffic reference information;
store programs that are computer readable and executable by the processing circuitry; and
store traffic map information or traffic route information.

19. The apparatus of claim 12, wherein, after the machine learning algorithm is deployed to
catch the similar road hazard, the processing circuitry is further configured to:
inform a driving control unit of the vehicle to avoid the similar road hazard after the similar road hazard is identified, the vehicle accordingly taking full autonomy avoidance of the road hazard, steering around, or slowing down for the road hazard; and
alert a driver of the vehicle of the road hazard.

20. A non-transitory computer readable storage medium having instructions stored thereon that when executed by processing circuitry causes the processing circuitry to perform operations, the operations comprising:

acquiring one or more sensor data generated by one or more sensors, the one or more sensor data carrying traffic information that the vehicle encounters during driving;

acquiring traffic reference information from a database;

comparing the one or more sensor data with the traffic reference information;

identifying a road hazard based on a comparison result between a first sensor data from a first sensor and the traffic reference information;

annotating other sensor data from other sensors to be associated with the road hazard, the other sensor data from other sensors being collected within a same time frame in which the first sensor data from the first sensor captures the road hazard;

outputting the first sensor data from the first sensor that captures the road hazard and the other sensor data from other sensors that are associated with the road hazard to a machine learning algorithm;

training the machine learning algorithm based on the first sensor data that captures the road hazard and the other sensor data that are associated with the road hazard; and deploying the machine learning algorithm to identify a similar road hazard in a new event based on one or more sensor data that is acquired in the new event.

* * * * *